US008657679B2

(12) United States Patent
Nguyen et al.

(10) Patent No.: US 8,657,679 B2

(45) Date of Patent: Feb. 25, 2014

(54) CLASS II/CLASS III HYBRID GAMING MACHINE, SYSTEM AND METHODS

(71) Applicant: IGT, Reno, NV (US)

(72) Inventors: Binh T. Nguyen, Reno, NV (US); James Stockdale, Clio, CA (US); Bryan Wolf, Reno, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 13/722,188

(22) Filed: Dec. 20, 2012

(65) Prior Publication Data

US 2013/0109466 A1 May 2, 2013

Related U.S. Application Data

(62) Division of application No. 13/363,519, filed on Feb. 1, 2012, now Pat. No. 8,376,843, which is a division of application No. 10/995,636, filed on Nov. 22, 2004, now Pat. No. 8,133,113.

(60) Provisional application No. 60/616,054, filed on Oct. 4, 2004.

(51) Int. Cl.
*A63F 13/00* (2006.01)

(52) U.S. Cl.
USPC .................................. 463/29; 463/16; 463/24

(58) Field of Classification Search
USPC ............ 463/16, 18, 19, 20, 21, 24, 25, 29, 42
See application file for complete search history.

(56) References Cited

U.S. PATENT DOCUMENTS

| | | | |
|---|---|---|---|
| 4,856,787 | A | 8/1989 | Itkis |
| 5,242,163 | A | 9/1993 | Fulton |
| 5,618,232 | A | 4/1997 | Martin |

(Continued)

FOREIGN PATENT DOCUMENTS

| | | |
|---|---|---|
| CA | 2445083 | 9/2004 |
| CN | 101065786 | 10/2007 |

(Continued)

OTHER PUBLICATIONS

U.S. Appl. No. 60/503,161, filed Sep. 15, 2003, Entitled "Gaming Network With Multi-Player Bingo Game," to Cannon.

(Continued)

*Primary Examiner* — James S McClellan
(74) *Attorney, Agent, or Firm* — Foley & Lardner LLP

(57) ABSTRACT

The present invention provides a gaming machine that can play both Class II and Class III games. Some implementations provide a gaming machine that has certain features (e.g., a true random number generator or "RNG") enabled for Class III play and disabled for Class II play. Some aspects of the invention provide methods for determining when a Class III game is available. Other aspects of the invention allow a player to "line up" for a desired Class III game while playing another game, such as a Class II game or another Class III game, on the same gaming machine until the desired Class III game is available. Some such implementations grant higher priority to certain players according to their gaming history, e.g., as indicated by player tracking/player loyalty data. Alternative aspects of the invention allocate available Class III games in other ways, e.g., by playing a Class II game for a chance to play a Class III game, by lottery, or otherwise. Player tracking information may be shared and/or combined for Class II and Class III game play and may be used to determine gaming history.

11 Claims, 12 Drawing Sheets

(56) References Cited

U.S. PATENT DOCUMENTS

| | | | |
|---|---|---|---|
| 6,402,614 | B1 | 6/2002 | Schneier et al. |
| 6,533,664 | B1 | 3/2003 | Crumby |
| 6,645,077 | B2 | 11/2003 | Rowe |
| 6,652,378 | B2 | 11/2003 | Cannon et al. |
| 6,656,040 | B1 | 12/2003 | Brosnan et al. |
| 6,884,173 | B2 | 4/2005 | Gauselmann |
| 6,908,387 | B2 | 6/2005 | Hedrick et al. |
| 7,035,626 | B1 | 4/2006 | Luciano, Jr. |
| 7,168,089 | B2 | 1/2007 | Nguyen et al. |
| 7,294,056 | B2 | 11/2007 | Lowell et al. |
| 7,467,404 | B2 | 12/2008 | McAllister et al. |
| 7,955,170 | B2 | 6/2011 | Gail et al. |
| 8,133,113 | B2 | 3/2012 | Nguyen et al. |
| 2003/0013521 | A1 | 1/2003 | Cole et al. |
| 2003/0092483 | A1 | 5/2003 | Bennett et al. |
| 2003/0134675 | A1 | 7/2003 | Oberberger |
| 2003/0216172 | A1 | 11/2003 | LeMay et al. |
| 2003/0228898 | A1 | 12/2003 | Rowe |
| 2004/0137978 | A1 | 7/2004 | Cole et al. |
| 2004/0162124 | A1 | 8/2004 | Barton |
| 2004/0176162 | A1 | 9/2004 | Rothschild |
| 2004/0179040 | A1 | 9/2004 | Patel et al. |
| 2004/0185931 | A1 | 9/2004 | Lowell et al. |
| 2005/0026694 | A1 | 2/2005 | Kelly et al. |
| 2005/0049037 | A1 | 3/2005 | Anderson et al. |
| 2005/0101387 | A1 | 5/2005 | Wolf |
| 2005/0261058 | A1 | 11/2005 | Nguyen et al. |
| 2006/0025189 | A1 | 2/2006 | Hollibaugh et al. |
| 2006/0025198 | A1 | 2/2006 | Gail et al. |
| 2006/0111168 | A1 | 5/2006 | Nguyen et al. |
| 2006/0121972 | A1 | 6/2006 | Walker et al. |
| 2006/0154710 | A1 | 7/2006 | Serafat |
| 2006/0154723 | A1 | 7/2006 | Saffari et al. |
| 2006/0211493 | A1 | 9/2006 | Walker et al. |
| 2007/0026935 | A1 | 2/2007 | Wolf et al. |
| 2007/0060363 | A1 | 3/2007 | Nguyen et al. |
| 2007/0155471 | A1 | 7/2007 | Powell et al. |
| 2007/0155472 | A1 | 7/2007 | Gail et al. |
| 2007/0155473 | A1 | 7/2007 | Powell et al. |
| 2007/0155490 | A1 | 7/2007 | Phillips et al. |
| 2007/0259709 | A1 | 11/2007 | Kelly et al. |
| 2008/0108405 | A1 | 5/2008 | Brosnan et al. |
| 2012/0129587 | A1 | 5/2012 | Nguyen et al. |

FOREIGN PATENT DOCUMENTS

| | | |
|---|---|---|
| JP | 2006-6804 A | 1/2006 |
| MX | 2007003879 | 6/2007 |
| WO | 2006/041627 | 4/2006 |

OTHER PUBLICATIONS

U.S. Appl. No. 60/592,410, filed Jul. 30, 2004, Entitled "Draw Bingo," to Gail et al.

U.S. Appl. No. 60/616,054, filed Oct. 4, 2004, Entitled "Class II/Class III Hybrid Gaming Machine, Systems and Methods," to Nguyen et al.

US Restriction Requirement dated Jan. 8, 2008 issued in U.S. Appl. No. 10/995,636.

US Office Action dated Jun. 23, 2008 issued in U.S. Appl. 10/995,636.

US Final Office Action dated Feb. 10, 2009 issued in U.S. Appl. No. 10/995,636.

US Office Action dated Jul. 16, 2009 issued in U.S. Appl. No. 10/995,636.

US Office Action dated Jul. 28, 2010, issued in U.S. Appl. No. 10/995,636.

US Final Office Action dated Jan. 7, 2011, issued in U.S. Appl. No. 10/995,636.

US Office Action dated Jun. 14, 2011, issued in U.S. Appl. No. 10/995,636.

US Notice of Allowance dated Nov. 2, 2011, issued in U.S. Appl. No. 10/995,636.

US Corrected Notice of Allowance dated Nov. 21, 2011, issued in U.S. Appl. No. 10/995,636.

US Office Action dated Jun. 22, 2012 issued in U.S. Appl. No. 13/363,519.

Third Party Submission for U.S. Appl. No. 13/363,519 dated Jul. 19, 2012.

US Notice of Allowance dated Oct. 30, 2012 issued in U.S. Appl. No. 13/363,519.

US Office Action dated Jan. 23, 2009 issued in U.S. Appl. No. 11/592,631.

US Final Office Action dated Jun. 9, 2009 issued in U.S. Appl. No. 11/592,631.

US Office Action dated Dec. 1, 2009 issued in U.S. Appl. No. 11/592,631.

US Office Action dated Jul. 19, 2010 issued in U.S. Appl. No. 11/592,631.

International Search Report & Written Opinion dated Feb. 15, 2006, issued in PCT/US2005/033737 (now Pub. WO/2006/041627), 10 pp.

International Preliminary Report on Patentability with Written Opinion, dated Apr. 11, 2007, issued in PCT/US2005/033737 (now Pub. WO/2006/041627), 7 pp.

Chinese Office Action dated Mar. 27, 2009 from Application No. 200580039992.8.

Chinese Office Action dated Jun. 7, 2010 from Application No. 200580039992.8.

Mexican Office Action dated Aug. 6, 2009 from Application No. 07/03879.

CLASS II/CLASS III HYBRID GAMING MACHINE, SYSTEM AND METHODS

RELATED APPLICATION DATA

This application is a divisional application of, and claims priority under 35 U.S.C. §120 to, co-pending U.S. patent application Ser. No. 13/363,519, by Nguyen et al., entitled "CLASS II/CLASS III HYBRID GAMING MACHINE, SYSTEM AND METHODS", filed on Feb. 1, 2012, which is itself a divisional of, and claims priority under 35 U.S.C. §120 to, U.S. patent application Ser. No. 10/995,636, by Nguyen et al., entitled "CLASS II/CLASS III HYBRID GAMING MACHINE, SYSTEM AND METHODS", filed on Nov. 22, 2004, now patented as U.S. Pat. No. 8,133,113, issued Mar. 13, 2012, which claims priority under 35 U.S.C. §119(e) to expired U.S. Provisional Patent Application Ser. No. 60/616,054, by Nguyen et al., entitled "CLASS II/CLASS III HYBRID GAMING MACHINE, SYSTEM AND METHODS", filed on Oct. 4, 2004, all of which are incorporated herein by reference for all purposes.

BACKGROUND OF THE INVENTION

The present disclosure relates to gaming machines, networks and methods for games of chance.

Gaming in the United States is divided into Class I, Class II and Class III games. Class I gaming includes social games played for minimal prizes and traditional ceremonial games. Class II gaming includes bingo and bingo-like games, such as pulltab games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Class II gaming may also include pulltab games if played in the same location as bingo games, lotto, punch boards, tip jars, instant bingo, and other games similar to bingo. Class III gaming includes any game that is not a Class I or Class II game, such as games of chance typically offered in non-Indian, state-regulated casinos.

A traditional pulltab game includes scratch-off and peel-off types of gaming involving a card that has an outcome printed on it. The game consists in displaying the outcome. A pulltab game has a finite number of outcomes (a "pool"), all at the same price, predetermined to attain an established payout (e.g., 3 $1000 winners, 5 $500 winners and 10 $100 winners). The outcome is fixed and does not depend on any action by the player. Pulltab games are, in principle, similar to lottery games. Therefore, as used herein, the terms "pulltab," "pulltab game," etc., will include lottery games.

Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

Gaming machines such as slot machines and video poker machines have proven to be very popular. Electronic Class II games, such as bingo and pulltab games, may be played on a networked gaming machine. However, many games of chance that are played on gaming machines fall into the category of Class III games, which may be subject to stricter approval and regulation. Many gaming establishments have a limited number of gaming machines for playing Class III games and a greater number of gaming machines for playing Class II games, such as bingo.

FIG. 1 is a simplified illustration of gaming establishment 100, having an area 105 of gaming machines dedicated to Class II gaming and an area 110 of gaming machines dedicated to Class III gaming. The Class II gaming machines are networked to a Class II game server 115 and to a player tracking server 120. In this example, the Class III gaming machines are networked to player tracking server 125, but are not networked for gaming purposes. Instead, the Class III gaming machines are configured to provide Class III gaming in a "stand-alone" mode. Player tracking servers 120 and 125 do not share information.

In general, Class III games tend to be more popular with players. Therefore, having a limited number of Class III games for a particular gaming establishment often causes lines of people to form, all waiting to play Class III games on a Class III gaming machine. In some instances, there are Class II gaming machines available for play, but some players choose to wait in line for a Class III gaming machine rather than play a Class II gaming machine. Having players wait in line serves neither the interests of the players themselves nor the interests of those who own or operate the gaming establishment: while players wait in line, they are not being entertained and are not generating revenue.

Considering the foregoing, it would be desirable to provide gaming systems and methods wherein players do not need to wait in line for a Class III game to become available to them. Preferably, such gaming systems and methods would allow the players to play Class II games until a Class III game becomes available.

SUMMARY OF THE INVENTION

The present invention provides a gaming machine that can play both Class II and Class III games. Some implementations provide a gaming machine that has certain features (e.g., a true random number generator or "RNG") enabled for Class III play and disabled for Class II play. Some aspects of the invention provide methods for determining when a Class III game is available. Other aspects of the invention allow a player to "line up" for a desired Class III game while playing another game, such as a Class II game or another Class III game, on the same gaming machine until the desired Class III game is available. Some such implementations grant higher priority to certain players according to their gaming history, e.g., as indicated by player tracking/player loyalty data. Alternative aspects of the invention allocate available Class III games in other ways, e.g., by playing a Class II game for a chance to play a Class III game, by lottery, or otherwise. Player tracking information may be shared and/or combined for Class II and Class III game play and may be used to determine gaming history.

Some embodiments of the invention provide a combination Class II and Class III gaming machine that includes apparatus for providing Class II gaming, apparatus for providing Class III gaming; and apparatus for determining when Class III gaming will be enabled or disabled. The gaming machine preferably includes apparatus for enabling Class III gaming when the determining apparatus determines that Class III gaming will be enabled and for disabling the means for providing Class III gaming when the determining means determines that Class III gaming will be disabled. The gaming machine includes apparatus for making the Class III game available to a player of the gaming machine.

The gaming machine may be configured to determine when a player has completed a session of Class III gaming and/or for determining when a Class III game is available. The gaming machine may be configured to alert a player that a Class III gaming session will be terminated unless the player takes an action and to determine whether the player has taken the action. The action may be, e.g., resuming the Class III gaming session, providing a monetary credit, indicating that the player desires to continue the Class III gaming session on another gaming machine, indicating that the player desires to continue the Class III gaming session on the combination Class II and Class III gaming machine at a later time. The maximum allowable later time may be based, at least in part, on the player's gaming history.

The gaming machine may determine when a player has completed a session of Class III gaming by reference to a gaming account balance, the proximity of the player, whether the player has chosen another game, whether a player has removed a player tracking card from the gaming machine and/or an indication that the player has not participated in the session of Class III gaming for a predetermined period of time. The predetermined period of time may be based, at least in part, on the player's gaming history. The gaming machine may determine when a Class III game is available by evaluating license data for the Class III game and/or by determining whether a maximum number of Class III gaming machines has been exceeded.

Some implementations of the invention provide a method for conducting Class II and Class III gaming on a single gaming machine. The method involves the following steps: providing Class II gaming on a gaming machine at a first time; determining whether a Class III game can be played on the gaming machine; and providing Class III gaming on the gaming machine at a second time when it is determined that the Class III game can be played on the gaming machine.

The method may also involve disabling Class III gaming functionality at a third time when it is determined that no Class III game can be played on the gaming machine. The determining step may involve determining when a player has completed a session of Class III gaming on another gaming machine and/or determining when a Class III game is available. Determining when a Class III game is available can involve determining whether a maximum number of Class III gaming machines has been exceeded.

The method may include the steps of receiving an indication that a player has completed a session of Class III gaming; and alerting the player that the session of Class III gaming will be terminated unless the player takes an action. The action may involve resuming the Class III gaming session, providing a monetary credit, indicating that the player desires to continue the Class III gaming session on another gaming machine and/or indicating that the player desires to continue the Class III gaming session at a later time. A maximum allowable later time may be based, at least in part, on the player's gaming history. The method should include the step of determining whether the player has taken the action.

The method may include the step of providing an authorization to continue the Class III gaming session on another gaming machine. The authorization to continue the Class III gaming session on another gaming machine is a temporary authorization and may be, for example, encoded in a cashless gaming instrument.

The indication that the player has completed a session of Class III gaming may be an indication that a gaming account balance is below a predetermined threshold, an indication that the player has removed a player tracking card from the gaming machine, an indication that the player has not participated in the session of Class III gaming for a predetermined period of time, an indication that the player has not been near another gaming machine for a predetermined period of time and/or an indication that the player has selected another game. The predetermined period of time may be based, at least in part, on the player's gaming history. Class III gaming is provided when the player selects an available Class III game.

Alternative implementations of the invention provide a gaming method that includes the following steps: providing a first electronic bingo game; providing electronic pulltab games after the first electronic bingo game is completed and before a second electronic bingo game has begun; and providing the second electronic bingo game.

Yet other implementations of the invention involve a method for providing a wagering game. The method includes the following steps: providing a first Class III wagering game to a player at a first time; allowing the player to select a second Class III wagering game; assigning a priority level to the player for the second Class III wagering game; and offering the second Class III wagering game to the player at a second time.

The first Class III wagering game may be provided to the player from the first time until the second time. The allowing step may involve allowing the player to continue playing the first Class III wagering game after selecting the second Class III wagering game. The priority level may be based, at least in part, on the player's gaming history. The offering step may involve offering the second Class III wagering game to the player for a period of time that is based, at least in part, on the player's gaming history.

Alternative embodiment of the invention provide a gaming machine that includes the following elements: apparatus for providing a first operational mode in which a game outcome is generated locally on the gaming machine using a random number generator after a game is initiated on the gaming machine by a player and in which choices made by the player during presentation of the game can influence the game outcome; apparatus for providing a second operational mode in which the game outcome is generated as part of a predetermined pool prior to the player initiating the game on the gaming machine and in which the choices made during the presentation of the game can not influence the game outcome; and logic for determining when to switch the gaming machine between the first operational mode and the second operational mode.

Yet other implementations of the invention provide a computer program embodied in a machine-readable medium. The computer program includes instructions for controlling a gaming machine to perform the following steps: providing Class II gaming on a gaming machine at a first time; determining whether a Class III game can be played on the gaming machine; and providing Class III gaming on the gaming machine at a second time when it is determined that the Class III game can be played on the gaming machine. The instructions may involve disabling Class III gaming functionality at a third time when it is determined that no Class III game can be played on the gaming machine. The instructions may also involve determining when a player has completed a session of Class III gaming on another gaming machine.

The instructions may also involve determining when a Class III game is available. Determining when a Class III game is available may involve determining whether a maximum number of Class III gaming machines has been exceeded. The instructions may involve receiving an indication that a player has completed a session of Class III gaming and alerting the player that the session of Class III gaming will be terminated unless the player takes an action. The instructions further comprise determining whether the player has taken the action. The indication that the player has completed a session of Class III gaming may be an indication that a gaming account balance is below a predetermined threshold, an indication that the player has removed a player tracking card from the gaming machine, an indication that the player has not participated in the session of Class III gaming for a predetermined period of time, an indication that the player has not been near another gaming machine for a predetermined period of time and/or an indication that the player has selected another game. The predetermined period of time may be based, at least in part, on the player's gaming history.

The action may be resuming the Class III gaming session, providing a monetary credit; indicating that the player desires to continue the Class III gaming session on another gaming machine and/or indicating that the player desires to continue the Class III gaming session at a later time. The maximum allowable later time may be based, at least in part, on the player's gaming history.

The computer program may provide an authorization to continue the Class III gaming session on another gaming machine. The authorization may be a temporary authorization and may be encoded in a cashless gaming instrument.

All of the foregoing methods, along with other methods of the present invention, may be implemented by software, firmware and/or hardware. For example, the methods of the present invention may be implemented by computer programs embodied in machine-readable media. The invention may be implemented by networked gaming machines, game servers and/or other such devices. These and other features and advantages of the invention will be described in more detail below with reference to the associated drawings.

DESCRIPTION OF THE PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention includes methods and devices for allocating Class III games. In some implementations of the invention, hybrid gaming machines provided that can be configured for either Class II or Class III gaming, while satisfying the regulatory requirements for both types of gaming. In part because of these legal requirements, some implementations of the invention provide a gaming machine that has certain features enabled for Class III play and disabled for Class II play. Some implementations of the invention provide a gaming network for such hybrid gaming machines.

Figure 1:
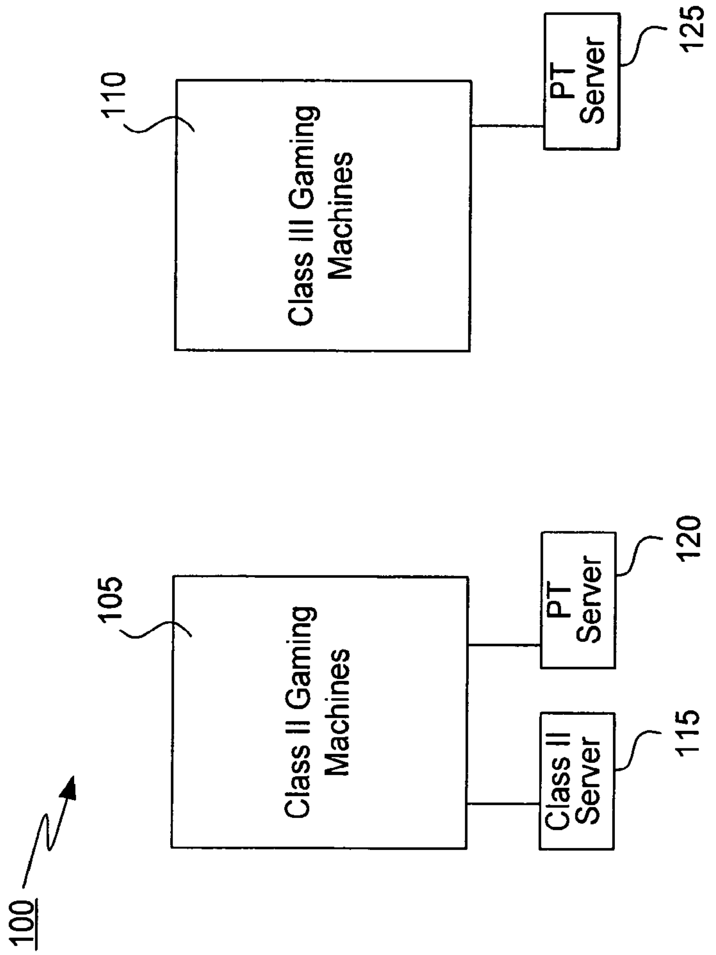
FIG. 1 is an illustration of a conventional gaming establishment that includes Class II and Class III games.
Figure 2:
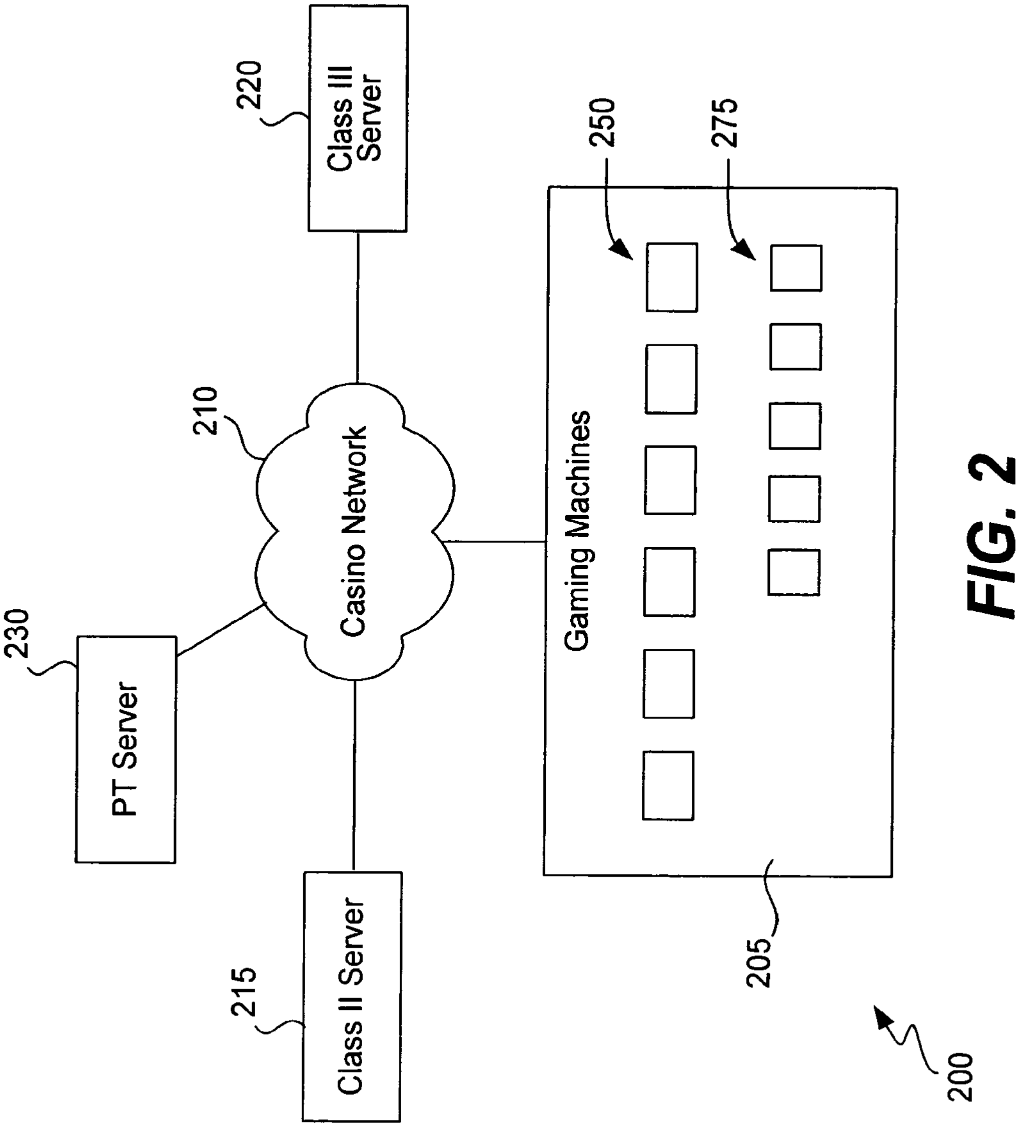
FIG. 2 is a network diagram that illustrates a simplified version of one implementation of the invention.

FIG. 2 illustrates gaming establishment 200, which includes gaming machines 205. In this example, at least some of the gaming machines 205 are networked hybrid Class II/Class III gaming machines 250 in communication with network devices that control Class II and Class III gaming via casino network 210. In this example, Class II gaming is controlled by Class II server 215 and Class III gaming is controlled by Class III server 220. In some preferred implementations, gaming machines 205 are also in communication with player tracking server 230. In some implementations, the servers shown in FIG. 2 are within the same gaming establishment, whereas in alternative implementations at least one of the servers is in another location and is in communication with casino network 210 via another network, e.g., the Internet.

Various other gaming services may be provided to gaming machines 205 via casino network 210 and/or the Internet, including accounting, cashless award ticketing, progressive games and bonus games. Such gaming services may be provided by server 215, server 220, or by other network devices not shown in FIG. 2. Some methods and devices for providing games and gaming services over a gaming network are described in U.S. patent application Ser. No. 10/116,424, filed Apr. 3, 2002 and entitled "SECURED VIRTUAL NETWORK IN A GAMING ENVIRONMENT," which is incorporated herein by reference in its entirety and for all purposes.

According to some implementations, at least some of legacy gaming machines 275 are also networked. For example, legacy Class II gaming machines may be in communication with Class II server 215 and player tracking server 230. However, some of gaming machines 205 may be "stand alone" machines, e.g., Class III machines that are not networked for gaming purposes.

It is often the case that a gaming establishment, e.g., on an Indian reservation, will have a "cap" on the number of Class III gaming machines that it can legally operate. In this example, gaming establishment is authorized to have 2,000 Class III gaming machines and has a total of 3,000 gaming machines 205. Moreover, gaming establishment 200 has limited licenses for various types of Class III games. For example, gaming establishment 200 may have a license for 50 "WHEEL OF FORTUNE™" games. However, some implementations of the invention allow a gaming establishment to increase the number of licenses for a particular game, e.g., as described in the SECURED VIRTUAL NETWORK IN A GAMING ENVIRONMENT application.

Some aspects of the invention allow a player to "get in line" for a Class III game while playing a Class II game until the Class III game is available. Preferably, the player may play the Class II game and the Class III game on the same gaming machine. For example, a player may play electronic bingo on one of hybrid Class II/Class III gaming machines 250 and choose (e.g., from a menu of Class III games for which the gaming establishment has a license) to play the next available WHEEL OF FORTUNE™ game. Some such implementations grant higher priority to certain players according to their gaming history, e.g., as indicated by player tracking/player loyalty data. Alternative aspects of the invention allocate available Class III games in other ways, e.g., by playing a Class II game for a chance to play a Class III game, by lottery, or otherwise. Preferably, the player tracking system will combine a player's information and awards for Class II and Class III game play.

Figure 3:
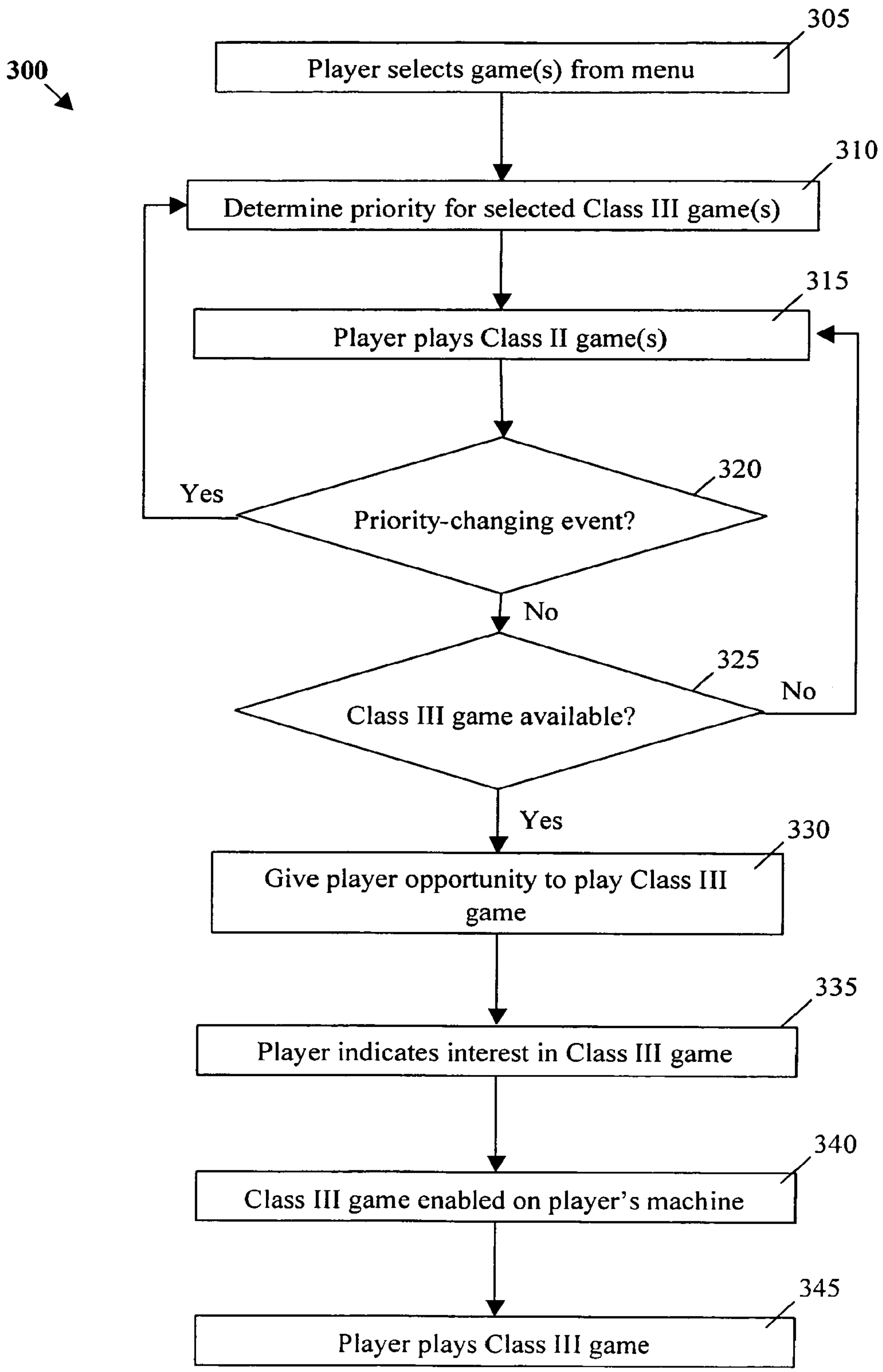
FIG. 3 is a flow chart that outlines some methods according to the present invention.

Method 300 according to the present invention involves some such aspects of the invention and is outlined in FIG. 3. The methods of the present invention, including method 300, need not be performed in precisely the sequence indicated, for example, in FIG. 3. Moreover, those aspects of the invention that are broadly outlined herein may involve more or fewer steps than are indicated or described.

Method 300 begins with step 305, wherein a player initiates play on a Class II/III hybrid gaming machine. In this example, the player starts playing a Class II game selected from a menu of Class II and Class III games. Some exemplary menus will be described below. In this example, there are no Class III games available. Accordingly, the player chooses to play a selected Class II game immediately and to indicate an interest in one or more Class III games that are currently unavailable, e.g., by selecting these games from the menu.

In step 310, the player is assigned a rank or priority level for the Class III game. In some implementations, a "first come, first served" approach is used to assign priority, at least initially. For example, if a player is the 5th player to request a Class III game, the player will be "put in line" behind 4 other players who previously requested the game. Meanwhile, the player plays one or more Class II games (step 315). In some implementations, the game requests are processed and priority levels are assigned by a network device such as a game server.

In alternative implementations, the player's rank is assigned, at least in part, according to the player's gaming history. In some such examples, the player's priority level may be increased by varying amounts according to the player's gaming history. The player's player tracking account may be accessed and used as part of the priority determination. The player's wagering levels during the current Class II gaming session may also be taken into account.

Some examples of using a player's gaming history as part of the priority determination involve assigning a plurality of wagering and/or gaming frequency levels. For example, 3 levels could be established according to an average wagering level. In one such example, if a player's average wager is $5 or less, that player will be assigned the lowest level, which in this example is termed Level 0. If the player's average wager is $5 to $20, the player will be assigned the middle level, Level 1. If the player's average wager is $20 or more, the player will be assigned the highest level, Level 2.

In this example, a Level 0 player will be treated as if an unmodified "first come, first served" prioritization scheme were in effect. In other words, if the player were the 6th person to request a Class III game, that player would simply be assigned a "6th in line" priority level. However, Level 1 and Level 2 players will be assigned higher priority levels, which can vary according to the implementation. In some implementations, a Level 1 player is simply assigned the next higher priority level: if the player were the 6th person to request a Class III game, that player would be assigned a "5th in line" priority level. Similarly if a Level 2 player were the 6th person to request a Class III game, that player would be assigned a "4th in line" priority level. However, in alternative implementations, Level 1 and/or Level 2 players may have their priorities increased by different amounts.

Alternative implementations involving the use of a player's gaming history as part of the priority determination use other methods of translating gaming history into a priority determination. For example, some methods are similar to those described above, except that more or fewer levels are established. Alternatively, a player's total wagers over a predetermined length of time may be used instead of an average wager. Gaming frequency may be used as a determining (or modifying) factor, e.g., the average number of times that the player has played a game of chance within a predetermined time. Moreover, whatever factors are used may be applied according to a method other than the "levels" approach outlined above. For example, various criteria could be assigned independent ranks and could be combined according to one or more functions (e.g., addition). A weighting function could be applied to gaming history criteria deemed more significant than others. Recent wagers or gaming frequency could be assigned greater weight than activity prior to a predetermined time. In some implementations, a "high roller" with an exceptional gaming history can be automatically placed to a top priority position (e.g., "next in line"), instead of using a calculation as described above.

It should be apparent that in some implementations of the invention, a player's priority level can be changed from an initial priority level. Accordingly, step 320 involves determining whether a priority-changing event has occurred. The player's priority level can be lowered in some instances, e.g., if a player having a superior gaming history makes a subsequent request. For implementations wherein a player's rank can subsequently be lowered, the player's numerical priority level (e.g., "You are 5th in line for Cleopatra") is preferably not indicated to the player. Otherwise, the player will realize when he or she has been "bumped" to a lower priority level and this would annoy and/or anger many players. Instead, if a player's priority is referenced, it is preferable to do so in less specific terms, e.g., with reference to an estimated time before the Class III game will be available. Such an estimate could be based upon known and/or estimated criteria such as the total number of Class III games of the requested type that are licensed by the gaming establishment, the average time a player plays a Class III game, etc.

Some methods of the present invention allow a player to avoid being "bumped" to a lower level. According to some "pay to play" methods of the invention, a player may prevent being bumped and/or increase his or her priority level by making a cash payment. For example, a player could be offered a range of priority level "upgrades," each of which has its corresponding price. According to some aspects of the invention, a high roller with at least a predetermined level of gaming history will not be at risk of being bumped to a lower priority.

In step 325, it is determined whether a Class III game is available. Some methods of determining whether a Class III game is available are discussed below with reference to FIG. 4. In some instances, the Class III game will be made available according to a prioritization scheme such as one of those described above. In some alternative implementations of the invention, at least some Class III games are made available without reference to a prioritization scheme. For example, a message could be broadcast to some or all players of Class II games on hybrid gaming machines according to the present invention, indicating that a particular Class III game is available and offering an opportunity to play the game. (Step 330.) For example, the message could be indicated by a "pop-up" message on a gaming machine display. The game could be allocated to, e.g., the first person to respond in a way indicating an interest in the game (e.g., by selecting the game from a GUI, by pressing a button, by using a voice command, etc.) (Step 335.) Alternatively, the game could be allocated to the 2nd, 3rd, or other predetermined ordinal number of a player who responds by indicating an interest in the game. In some such implementations, such a message will be broadcast only to players having at least a threshold level of gaming history (e.g., to "high rollers" such as Level 2 players described above).

In some implementations, some Class III games are made available without reference to a prioritization scheme and other Class III games are made available according to a prioritization scheme. For example, in the context of a method of allocation Class III games according to a prioritization method, notice of every 10th Class III game that becomes available could be broadcast to some or all Class II game players. In some implementations, a predetermined percentage or number of Class III games are randomly made available outside of a prioritization scheme. Some Class III games can be selectively made available to players who have a low priority level and/or long estimated waiting time, in order to provide a further incentive for these players to keep playing Class II games and "stay in line."

Alternatively, a selected number of Class III games could be distributed by lottery. Still further, some or all players could be presented with the opportunity to play a Class II game, the winner of which will be allocated a Class III game. In some implementations, a player who selected one Class III game will be offered an opportunity to play another Class III game that becomes available before the selected game.

Steps 330 and 335 are optional. In some implementations, for example, if a player is still playing a Class II game and that player is next in line when a Class III game becomes available, the game will automatically be assigned to the player without requiring the player to indicate a continued interest in the game. The Class III game could begin, for example, after the Class II game has completed.

If the player persists, a Class III game will eventually be enabled on his or her gaming machine (step 340), allowing the player to play the Class III game (step 345). In preferred embodiments, the Class III game is downloaded from a network device such as Class III server 220, as described in more detail below. The player's gaming machine will preferably initiate a routine for enabling Class III functionality that was previously disabled while the gaming machine was used for Class II play.

Various methods may be used to transmit game data according to the present invention. For example, these game data may indicate game displays, intermediate steps or results for central determination games, e.g. Class II games, such as what bingo card will be used by a particular gaming machine. In some implementations, game data for central determination games are generated using one or more RNG (random number generating) seeds, each of which will provide a known outcome. U.S. Pat. No. 6,533,664, entitled "Gaming System with Individualized Centrally Generated Random Number Generator Seeds," describes the use of RNG seeds and is hereby incorporated by reference for all purposes. Each of the RNG seeds has been pre-calculated to produce a predetermined outcome when processed by a pre-programmed "deterministic RNG." The RNG seeds are advantageous for security purposes and other reasons.

Figure 4:
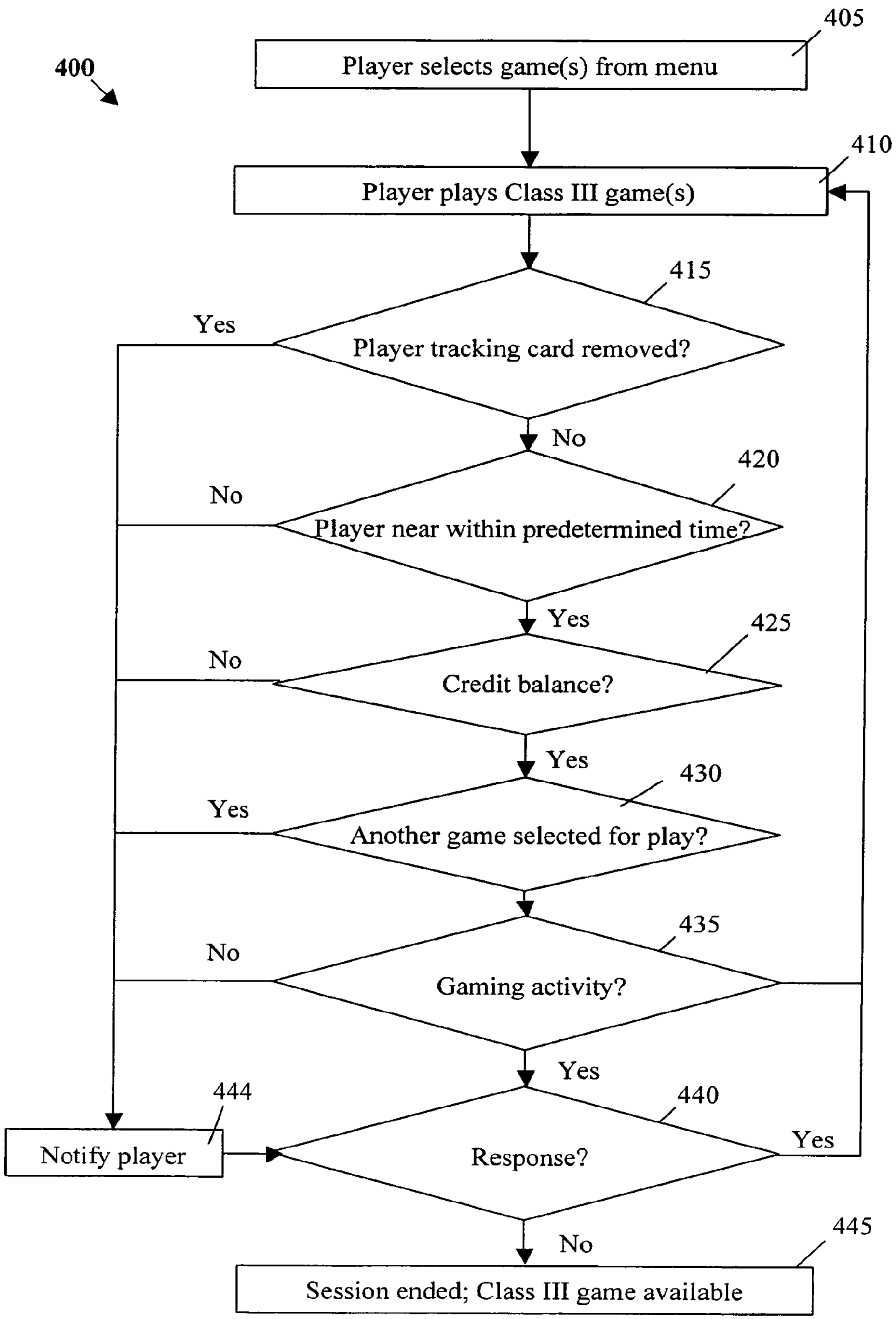
FIG. 4 is a flow chart that outlines some methods of determining when a game is available according to the present invention.

FIG. 4 is a flow chart that outlines the broad contours of some methods for determining when a game is available for allocation, according to some aspects of the invention. As noted above, method 400 need not be performed in precisely the sequence indicated in FIG. 4. Moreover, those aspects of the invention that are broadly outlined herein may involve more or fewer steps than are indicated or described. In most implementations, the steps of method 400 are performed by the gaming machine on which a Class III game is being played.

In steps 405 and 410, a player selects one or more Class III games and plays the game(s). In this example, the player selects a single Class III game and plays it. The player may or may not be using a player tracking card or similar device. The following steps may be triggered in response to changing conditions or may involve periodic evaluations. Step 415 is relevant when a player has previously inserted a player tracking card into the gaming machine. If it is determined in step 415 that the player tracking card has been removed, the player is notified in step 444 that the gaming session will be terminated unless the player takes action. For example, the player may be asked to re-insert the player tracking card, to increase a credit balance, etc.

If the player responds during a predetermined time (step 440), the player may continue playing the game. If not, the session ends and the Class III game is made available (step 445).

Some gaming machines according to the present invention (as in this example) are equipped with a proximity detector for determining whether the player remains near the gaming machine. In step 420, it is determined whether the player is still nearby. If not, the method proceeds to step 444. If so, the method continues to step 425 in this example.

In step 425, the player's credit balance is evaluated. If the balance drops to zero, the method proceeds to step 444. Otherwise, the method continues to step 430.

In this example, only one Class III game is available to the player at any given time. Therefore, if the player has been playing one Class III game and then selects another Class III game (step 430), the player is notified that the first game will be made available unless the player takes action (e.g., by re-selecting the first game).

In step 435, it is determined whether there has been recent gaming activity, i.e., whether the player has been playing the Class III game within a predetermined time. If not, the player will be notified to either take action or surrender the Class III game. The predetermined time may depend, at least in part, on the player's gaming history. For example, "high rollers" and/or frequent players may be given a longer predetermined time and/or a longer time to respond to a notification.

Some implementations provide a "reserve" feature that allows a player to take a break from gaming without losing the game. The reserve feature may be free (or for a longer time) for high rollers and require a fee from other players (or be for a shorter time). A reserved gaming machine may indicate that it is being reserved, e.g., by having a message displayed such as, "This machine is reserved for Mr. Hancock." Some implementations temporarily disable a reserved gaming machine. Some such implementations require player identification and only allow the same player to re-enable the machine, e.g., within a certain time frame. U.S. patent application Ser. No. 09/921,489, entitled "Player Tracking Communication Mechanisms in a Gaming Machine," describes relevant technologies and is hereby incorporated by reference. Alternative implementations allow a player to reserve a game license for the game that was being played, e.g., by a voucher that is valid for a certain length of time.

Figure 5B:
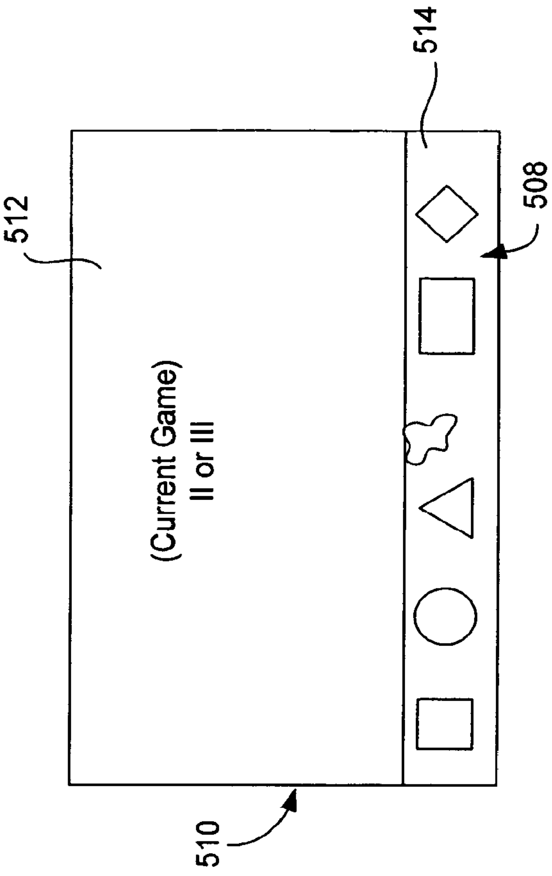
FIGS. 5A through 5D are examples of graphical user interfaces ("GUIs") that may be used to implement various aspects of the invention.
Figure 5A:
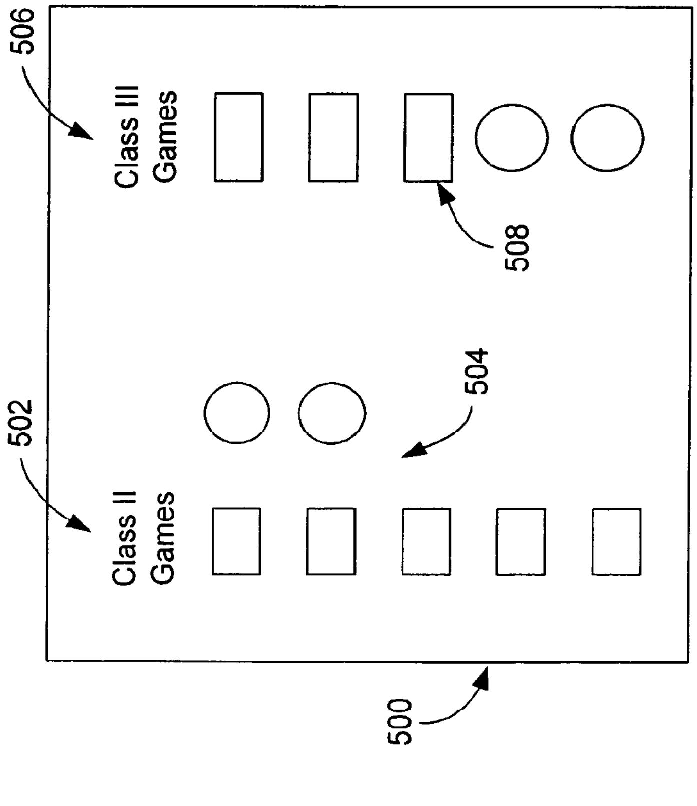

Some exemplary GUIs for implementing various aspects of the invention are illustrated in FIGS. 5A through 5D. FIG. 5A indicates GUI 500, which is one example of a menu for selecting Class II and/or Class III games for play on a hybrid gaming machine. Area 502 indicates various icons 504 that correspond with Class II games for which a gaming establishment has licenses. Similarly, area 506 indicates icons 508 that correspond with Class III games for which the gaming establishment has licenses. In some implementations, the display will indicate which games are currently available. For example, the word "Available!" or the like may be displayed on or near the relevant icon. Alternatively, or in addition, icons for available games could be displayed with a different appearance as compared to icons for games that are not available. For example, icons for unavailable games could be "grayed out," smaller, not in color, have a lower brightness and/or contrast, etc.

In this example, GUI 500 allows a player to select a game to play immediately and also allow a player to "get in line" for one or more games that are currently unavailable. For example, a player may select an icon from area 502 (e.g., by touching a display screen, using a mouse, etc.) to select a game for immediate play and, if desired, also select one or more currently unavailable games. The player's priority for currently unavailable games may be determined as described elsewhere in this disclosure.

GUI 510 of FIG. 5B includes area 512, for displaying a game that is currently being played, and area 508, for displaying icons corresponding to other games for which the gaming establishment has a license. After a player has selected a game to play immediately (e.g., from a menu such as that shown in FIG. 5A), area 512 will be used to enable play of that game. A player may select games by choosing icons from area 508. In some implementations, area 508 is only used to display games that are currently available. In other implementations, area 508 is used to display games that are currently available and others that are unavailable. In some such implementations, the games in area 508 are based upon a player's gaming history: for example, games that the player has selected in the past may be displayed.

Figure 5D:
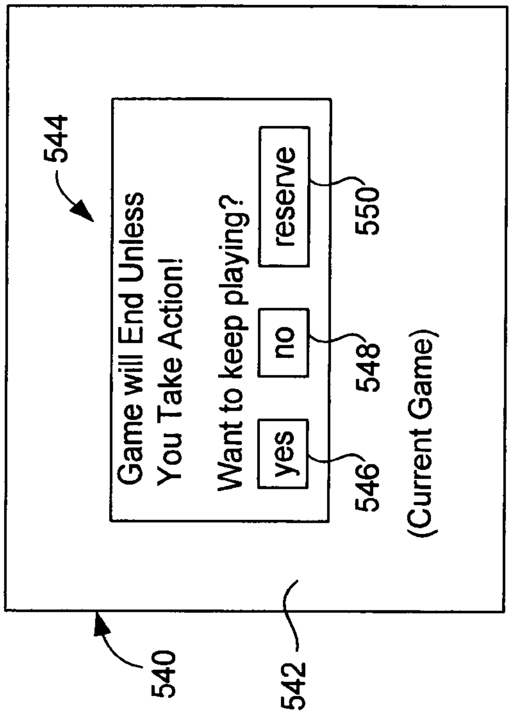
Figure 5C:
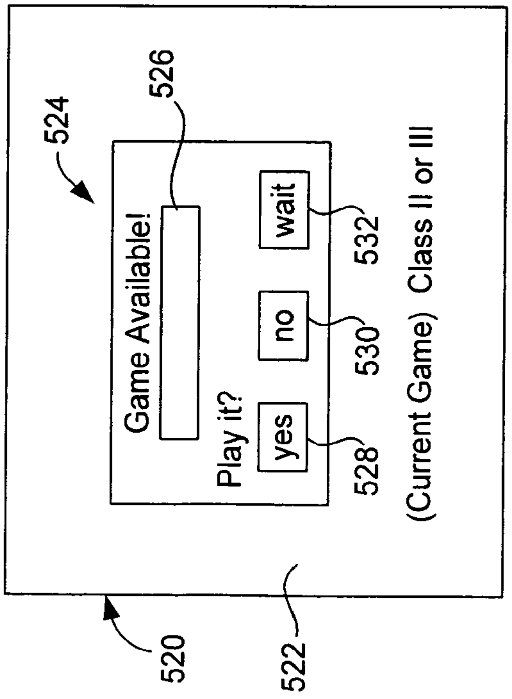

FIG. 5C illustrates GUI 520, which is an example of a GUI that allows a player to be notified when a game is available. Area 522 is used to display a game currently being played. Pop-up menu 524 alerts a player that a game is currently available. In this example, pop-up menu 524 includes game icon 526 for identifying the available game, "Yes" button 528 for selecting a game, "No" button 530 for indicating no current interest in the game and "Wait" button 532. Depending on the implementation, both "No" button 530 and "Wait" button 532 may be optional. Moreover, the GUI displayed (and/or the functions of the buttons, etc., of the GUI) may change somewhat according to the specific implementation.

For example, if the game is being simultaneously broadcast to more than one player, the game may be allocated to the first player to indicate an interest in the game, e.g., by activating "Yes" button 528 or the like. If the game is being offered to a number of players in sequence, e.g., according to a prioritization method as described elsewhere herein, pop-up menu 524 may be displayed for a predetermined time unless one of the buttons is activated. A player's activation of "No" button 530 could, for example, cause the game to be offered more quickly to another player. The "Wait" feature 532 may be available only for selected players, e.g., based on a player's gaming history. Alternatively, the amount of time that the "Wait" feature 532 will allow the game to be reserved for the player may vary according to a player's gaming history.

Moreover, if the new game selected is a Class III game and the player has been playing a Class II game, in preferred implementations the gaming machine will enable Class III gaming features and, if necessary, cause the game to be downloaded from a game server. Conversely, if the new game selected is a Class II game and the player has been playing a Class III game, in preferred implementations the gaming machine will disable Class III gaming features and, if necessary, download the selected Class II game.

FIG. 5D illustrates exemplary GUI 540, which may advantageously be used to implement a notice such as that of step 444, described above with reference to FIG. 4. Here, area 542 is used to display a current game and pop-up menu 544 alerts a player that the game will be allocated to another player unless the player takes action. Here, the player is prompted to indicate continued interest in the game by activating "Yes" button 546 or to release the game by activating "No" button 548. This implementation also allows a player to reserve the game for a predetermined time by activating "Reserve" button 550. As mentioned elsewhere herein, this feature allows the player to take a break and return to the game within a predetermined time. In some implementations, the gaming machine and the game will be reserved. In other implementations, only the game will be reserved.

Figure 6:
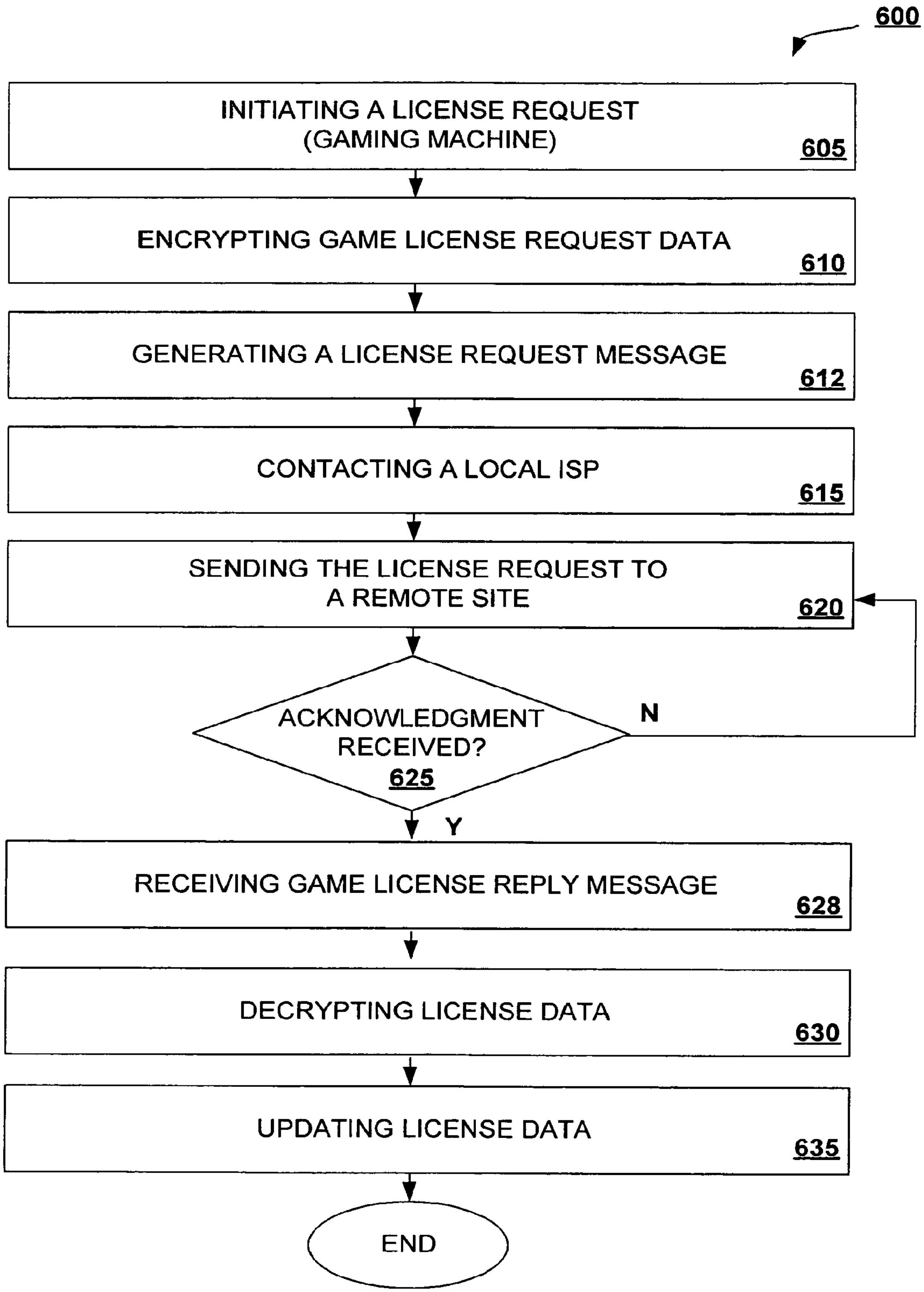
FIG. 6 is a flow chart depicting a method of obtaining a game license from a gaming machine.

FIG. 6 is a flow chart depicting method 600 of obtaining a game license on a gaming machine providing game play of one or more games. In 605, a gaming machine initiates a gaming license request. In one embodiment, the gaming license request may be initiated when a current gaming license on the gaming machine is about to expire. In another embodiment, the gaming license request may be initiated in response to a player on a gaming machine requesting a game play of a particular game. In 610, game license request data used to provide and implement gaming licenses is encrypted. The game license data may be encrypted using a symmetric encryption key and the symmetric encryption key may be asymmetrically encrypted using a public key. The game license request data may include the symmetric encryption key, a serial number of the software corresponding to one or more games or some other software identification number, a serial number of the gaming machine as well as other machine identification information, game owner identification information, game usage data including the number of times a gaming license has been used and license expiration data. The game usage data may be used to bill the gaming entity owning the gaming license for use of the game license. The software identification number in the gaming license data may correspond to one or more games such as a video slot game, a mechanical slot game, a video poker game, video blackjack game and video pachinko game.

In 612, a game license request message is generated with the encrypted game license request data. The game license request message may be sent to a remote server using a TCP/IP protocol. Thus, the game license request message may include an IP address and/or an UID of the remote server as well as an IP address and/or an UID of the gaming machine. The gaming machine may store the IP addresses and/or the UIDS of one or more remote servers in a memory residing on the gaming machine. Prior to sending the gaming license request message, the gaming machine may look-up the IP address and/or the UID of the destination remote server. The gaming license request message may include one or more signatures used by the recipient of the message to unambiguously identify the sender of the message and to validate the accuracy of the data contained in the message. The signatures may be generated by the gaming machine and appended to the message.

In 615, when communications between the gaming machine and a local ISP have not been established, the gaming machine may contact a local ISP and establish communications. In one embodiment, the gaming machine may not directly contact a local ISP. Instead, the gaming machine may contact and may send the gaming license request message to a local server that contacts a local ISP and sends the gaming license request message. In another embodiment, the gaming machine may send unencrypted gaming license request data to the local server. The local server may encrypt the gaming license request data, generate a gaming license request message and send the message to a remote server such as a gaming license request server. One of skill in the art will appreciate that some implementations do not employ a local ISP, but instead employ direct routing by a private line, a virtual private network ("VPN") tunnel, or some other form of communication.

In 620, the gaming machine sends the gaming license request message to a remote site such as a game license server via the local ISP. When a communication protocol such as TCP/IP is used, the message may be encapsulated in multiple information packets. In 625, the gaming machine determines whether an acknowledgement from the remote site has been received. When the acknowledgement from the remote site has not been received, the gaming machine may resend the message according to 620.

In 628, the gaming machine receives a game license reply message. The game license reply message may include a number of signatures used by the gaming machine to authenticate the sender of the message and to validate the data contained in the message. In 630, the gaming machine may decrypt an asymmetrically encrypted symmetric encryption key using a private key stored in memory on the gaming machine and then decrypt the game license reply data with the symmetric encryption key. The game license reply data may include a game license for one or more games available on the gaming machine. The game license may be an identification number of some type that allows software on the gaming machine corresponding to the license to be executed. The game license reply data may also include an expiration date for the license. In 635, the gaming machine may update game license data stored on the gaming machine when a new game license was included in the game license reply data. In one embodiment, the game license request message may include game usage data without a request for a new license. In this case, the game license reply message may include an acknowledgement that the game license request message was received but may not contain a new game license.

An advantage of the game license request method is that a gaming machine owner may be able operate gaming machines including many different types of games but only pay for each game on a per use basis. In a "pay-as-you go" billing scheme, an operator of the gaming machine is charged each time a game is played on the gaming machine. At regular intervals, a usage fee may be paid by the operator of the gaming machine to the owner's of the gaming software used on the gaming machine. The cost per use of each game may be varied from game to game and these costs may change with time. For example, the cost per use charged for newer gaming titles may be higher than the cost per use charged for older gaming titles. Thus, when a particular game is unpopular, the costs to the gaming machine operator are minimized as compared to when the gaming machine operator pays up front for a gaming machine with a game that receives little game play.

Another advantage of the game license request method is that it may also be used for other types of game service requests. For instance, a report request message with encrypted report request data may be generated in the manner described above and sent to a remote server via a local ISP. When a report reply message is received via the local ISP containing a report, the report may be displayed to the gaming machine. In another example, a gaming machine may send a maintenance request message via a local ISP in a manner described above.

Figure 7:
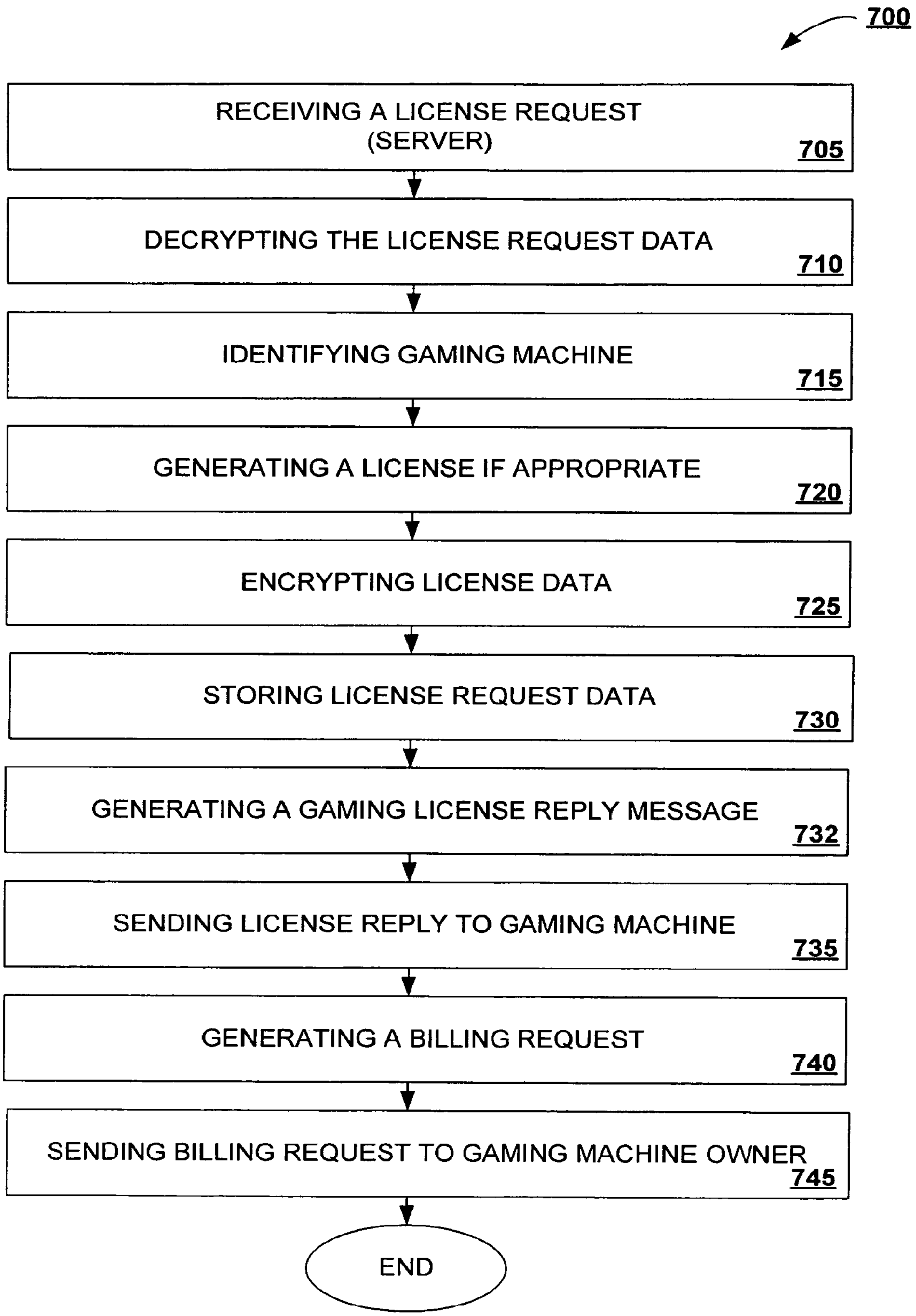
FIG. 7 is a method of providing a game license from a network device to one or more gaming machines.

FIG. 7 is a flow chart depicting a method 700 of providing a game license to one or more gaming machines using a remote server. In 705, the remote server receives a game license request message from a gaming machine, local server or some other device. The message may have been received via a local ISP in communication with the remote server. As described above, although not shown in the flow chart, the remote server may also receive a report request, maintenance request or some other transaction request from the gaming machine, local server or remote device. After receiving the message, the remote server may authenticate the sender of the message using one or more signatures contained in the message and validate the accuracy of the data in the message using one or more signatures contained in the message. For instance, the remote server may generate a checksum on the data in the message and compare it with a checksum generated by the gaming machine on the data in the message which was appended to the message.

In 710, the remote server may decrypt a symmetric encryption key included in the game license request message using a private encryption key. With the symmetric encryption key, the remote server may decrypt the game license request data. The game license request data may include a serial number of the software corresponding to one or more games or some other software identification number, a serial number of the gaming machine as well as other machine identification information, game usage data including the number of times a gaming license has been used, license expiration data and game owner identification information.

In 715, using the serial number of the gaming machine and the other machine identification information the remote server may identify the gaming machine. The serial number of the gaming machine is one example of an UID that may be used with the present invention. A table of gaming machine identification information may be stored on the remote server. From the gaming machine identification information, the remote server may be able to determine the type of gaming machine and the games available on the gaming machine. In 720, when appropriate, the remote server may generate a new gaming license for the gaming machine. If the gaming license request message includes a request for a gaming license not available on the gaming machine or not enabled for some reason on the gaming machine, then the gaming license request may be denied. In another example, the game license request may include game usage information for billing purposes and a new game license may not be required.

In 725, when a new game license is generated, the game license reply data including the new game license may be encrypted with a symmetric encryption key and the symmetric encryption key may be asymmetrically encrypted with a public key. In other cases, the game license reply message may include an acknowledgement that the message was received but may not include a new game license. In 730, the information regarding the game license request such as the machine identification information, a type of game license request (e.g. type of game), a time of the request and whether the request was granted may be stored on the remote server.

In 732, a game license reply message with the game license reply data may be generated. In 735, via a local ISP and the Internet, the game license reply message may be sent to the local server and/or the gaming machine. In 740, a billing request message based upon the game usage data contained in the game license request or the type of license requested may generated. In 745, the billing request message may be sent to the gaming machine owner identified in the gaming license request message.

Figure 8A:
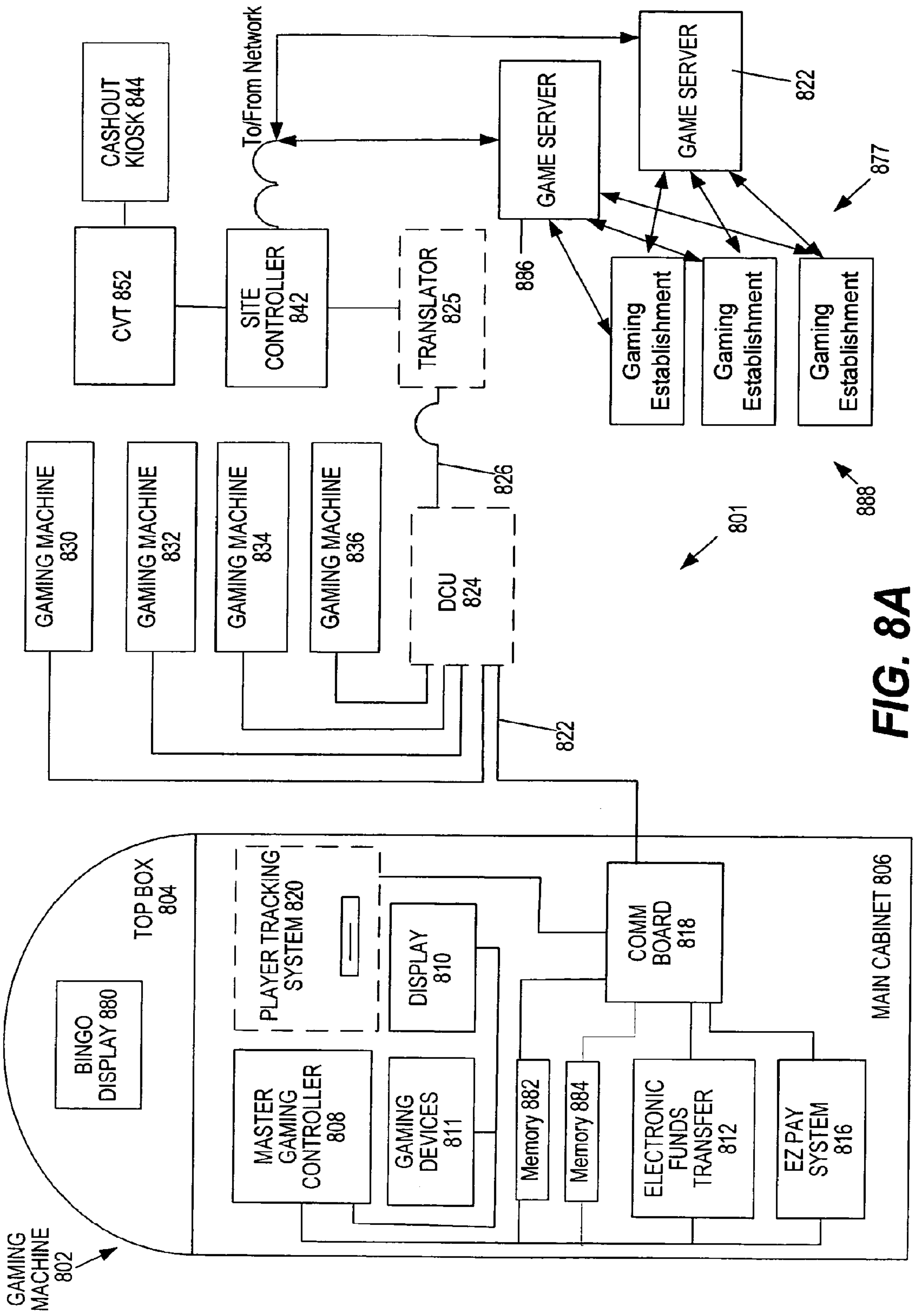
FIG. 8A is a block diagram of a number of gaming machines in a gaming network that may be configured to implement some methods of the present invention.

One example of a gaming machine network that may be used to implement some such methods of the invention is depicted in FIG. 8A. Gaming establishment 801 could be any sort of gaming establishment, such as a casino, a card room, an airport, a store, etc. In this example, gaming network 877 also includes gaming establishments 888, all of which are networked to Class II game server 822 and Class III game server 886.

Here, gaming machine 802, and the other gaming machines 830, 832, 834 and 836 are hybrid Class II/Class III gaming machines according to the present invention. In this example, the hybrid gaming machines include a main cabinet 806 and a top box 804. The main cabinet 806 houses the main gaming elements and can also house peripheral systems, such as those that utilize dedicated gaming networks. The top box 804, which includes bingo display 880 in this example, may also be used to house these peripheral systems.

The architecture of hybrid gaming machine 802 that is indicated in FIG. 8A is purely exemplary. More or fewer processors, memories, etc., may be present. Gaming machine 802 preferably includes one or more logic devices (e.g., a high performance processor), random access memory ("RAM"), fixed code memory, temporary game storage memory, non-volatile memory (preferably high-speed non-volatile memory), a graphics display subsystem, an audio subsystem, an input/output subsystem and a network connection (preferably a high-speed network connection such as a high-speed LAN connection).

One or more logic devices (e.g., master gaming controller 808) execute instructions to implement Class II and Class III gaming. Some such instructions may be stored, e.g., in RAM or fixed code memory. RAM may be used, for example, to store operating software including game code, device drivers, game support functions, etc. Fixed code memory may be used to store software that is used to initialize the gaming machine, perform system diagnostics, establish initial connections to game servers 822 and 886, store authentication and/or encryption/decryption algorithms, etc. The fixed code memory may advantageously be distributed across multiple memory devices and/or partitions of individual memory devices: as noted below, such a distribution allows certain portions of memory (the true random number generator) to be disabled at times. For example, this software may be disabled when those functions are not required by currently operating game software (e.g., Class II game software).

In this example, master gaming controller 808 also controls Class II game play on hybrid gaming machine 802 according to instructions and/or game data from game server 822 and receives or sends data to various input/output devices 811 on the gaming machine 802. Details of exemplary systems for using a game server to control a network of gaming machines to implement Class II games are described in U.S. Patent Application No. 60/503,161, filed Sep. 15, 2003 and entitled "Gaming Network with Multi-Player Bingo Game," and U.S. Patent Application No. 60/592,410, filed Jul. 30, 2004 and entitled "Draw Bingo." These applications are hereby incorporated by reference for all purposes. A gaming controller (e.g., master gaming controller 808 or another controller dedicated to Class III gaming) controls Class III functionality.

Game images downloaded from game servers may be stored in temporary game storage memory. A local copy of the game image is preferably used during game play, thereby minimizing the amount of network traffic. In preferred implementations, after a player has completed a session of game play, the local game image is purged from the temporary game storage memory, which is then available to store the next downloaded game. U.S. Pat. No. 6,645,077, entitled "Gaming Terminal Data Repository and Information Distribution System," describes relevant methods and devices and is hereby incorporated by reference for all purposes.

High-speed non-volatile memory is preferably used to store critical game play parameters as well as terminal and system-wide parameters. These parameters allow, for example, a gaming machine to be restored to its correct state after an interruption of power.

The graphics and display subsystem provides the game presentation and related entertainment to a player. The audio subsystem may provide music, spoken feedback and/or sound effects to the player during game play. In some implementations, the audio subsystem (or another subsystem) includes a microphone that for receiving voice commands, player voice recognition, etc.

In this example, hybrid gaming machine 802 can initialize itself from local non-volatile memory and establish a connection with one or more game servers. Trusted authentication software is preferably used during all phases of operation to ensure the correctness and authenticity of software to be executed by a logic device. Failures detected by the trusted authentication software preferably result in an immediate fault condition, requiring intervention by an attendant, a network manager, etc.

A typical Class III gaming machine includes features that are not present in Class II gaming machines. For example, a typical Class III gaming machine includes software for generating truly random numbers, which will also be referred to herein as "RNG code" or the like. This RNG code is typically resident in a non-volatile memory such as one of the fixed code memory devices described above. A typical gaming machine for playing Class III central determination or Class II games lacks a true RNG capability. Moreover, in some jurisdictions, it is required that such gaming machines lack the ability to generate truly random numbers.

Therefore, some hybrid gaming machines according to the present invention have certain capabilities disabled while playing Class II games. For example, some such implementations have memory devices and/or logic devices that are dedicated to either Class II gaming (e.g., memory 882 of FIG. 8A) or Class III gaming (e.g., memory 884 of FIG. 8A). Note that memories 882 and 884 may represent a plurality of memory devices, possibly including various types of memory devices as described elsewhere herein. Such implementations may be considered to have the memory devices and/or logic devices segregated according to game class. Alternative implementations of the invention include partitioned memory devices (e.g., one or more partitioned hard drives), with part of the memory dedicated to storing software and data for Class II functionality and another part dedicated to Class III. In some implementations, there are two instances of the operating system: one instance is for Class II and one is for Class III. A master logic device, such as master gaming controller 808, may determine when Class III gaming functionality is enabled or disabled. Alternatively, this determination could be made by a site controller, a game server or another device. One example of this process is described below with reference to FIG. 8B.

Devices that are dedicated to Class III gaming may be, for example, physically switched off while a Class II game is being played and switched on while a Class III game is being played. Some such implementations have their true RNG capability disabled while playing Class II games and enabled while playing Class III games. This prevents a "cheat" based on local generation of a number to create an unauthorized win of a central determination game.

As noted elsewhere herein, Class II games may advantageously use deterministic RNG hardware and/or software, e.g., for translating game data from a Class II game server that is in the form of RNG seeds. Therefore, such deterministic RNG hardware and/or software may be enabled in a hybrid Class II/Class III gaming machine during Class II game play, even though the ability to locally generate truly random numbers may be disabled.

In some implementations, functions required for Class III gaming are downloaded with a Class III game after the Class III game becomes available to the player. These functions are preferably not usable for Class II gaming. In some embodiments of the invention, these functions are stored in one or more memory devices while in use for Class III gaming and then are deleted when the gaming machine returns to Class II gaming.

Whether the functionality for Class III gaming is always resident in the machine or is sometimes stored and sometimes deleted, preferred embodiments of the invention include a validation procedure prior to Class II gaming. The validation procedure may be based on software, hardware, firmware or the like. In some implementations, the validation procedure determines whether Class III functionality is enabled and does not permit Class II gaming unless and until the Class III functionality is disabled.

A Class II bingo game normally uses an extra display to show the bingo game. When the game is changed from Class II mode to Class III mode, the primary (e.g. slot) display may continue to show the slot game, but the bingo display may show non-bingo data, such as a static image, paytable data or attract display, instead of the bingo game display. In some preferred implementations, the gaming machine will have both a non-deterministic, securely random RNG for Class III games and a deterministic RNG for Class II bingo and pulltab games. The gaming machine should support a communications module for receiving bingo and/or pulltab game results. When playing a Class III game, the gaming machine should disable the deterministic RNG and use the non-deterministic, securely random RNG for determining game results. When playing a pulltab game, the non-deterministic, securely random RNG should be disabled and the communications module will receive an RNG seed for determining the pulltab game outcome. The communications module will seed the deterministic RNG, which will then be used to determine the game results.

When playing a bingo game, the communications module will receive the bingo ball draws and cause them to be shown on the bingo display. When the bingo game outcome is known, the communications module will select an RNG seed that will produce the same outcome on the slot display as has occurred on the bingo display, and seed the deterministic RNG with it. The deterministic RNG will then be used to determine the game outcome on the slot display. U.S. patent application Ser. No. 10/969,127, filed on Oct. 19, 2004 and entitled "Providing Non-Bingo Outcomes for a Bingo Game," is hereby incorporated by reference in its entirety. This application provides, inter alia, a description of playing a bingo game and using a deterministic RNG for a slot game display.

Many pulltab games require physical pulltab tickets. Thus, when playing the Class II pulltab game, the bill validator may be enabled to receive pulltab tickets and play them accordingly. When playing a Class II bingo game or a Class III game, the bill validator could be configured to reject pulltab tickets.

Enabling RNG functionality, communications modules and bill validator features are a few aspects of a gaming machine's reconfiguration process according to some implementations of the invention. Other, additional features may also be enabled or disabled when the gaming machine is reconfigured.

Figure 8B:
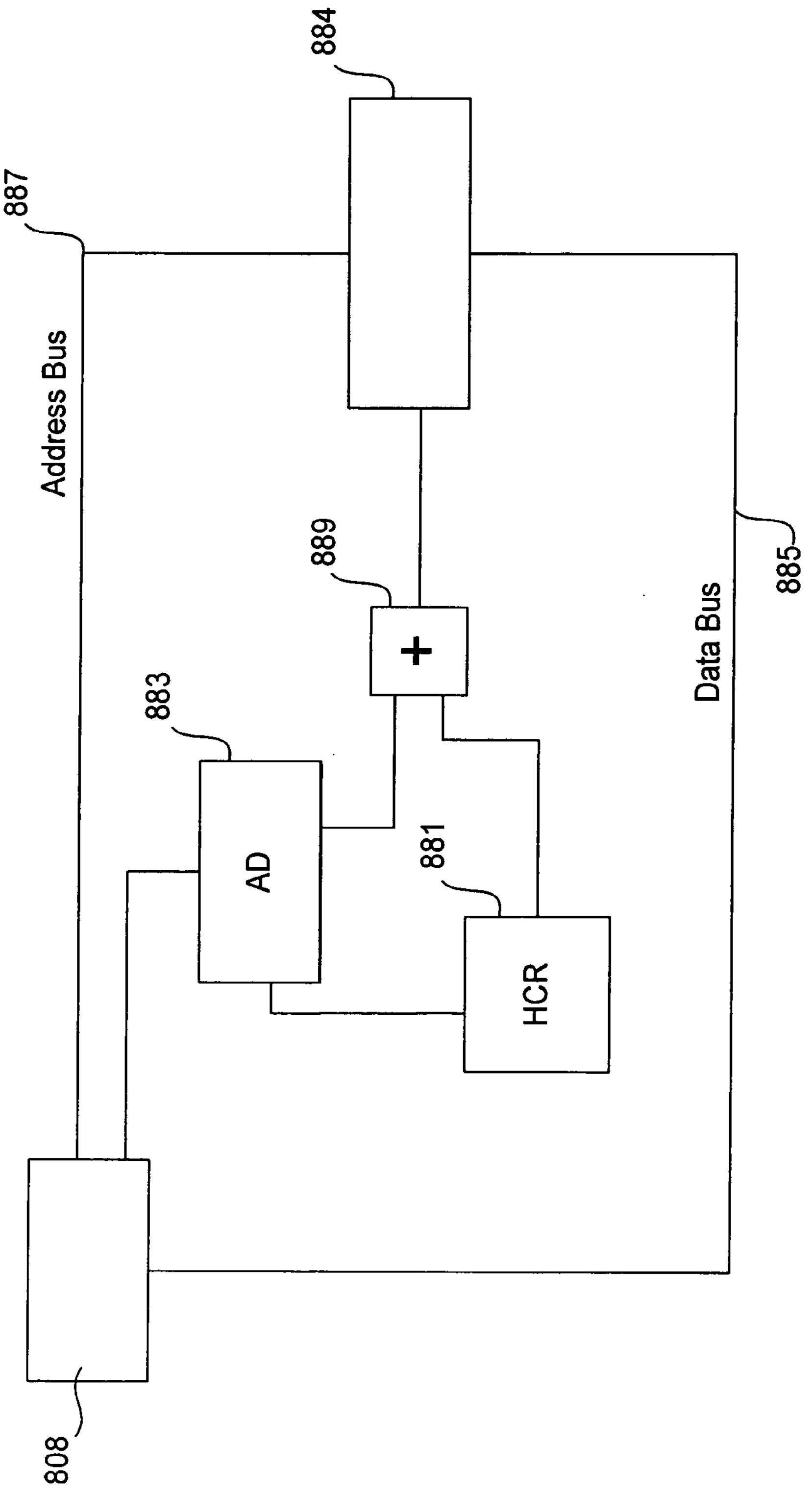
FIG. 8B is a block diagram of a system for implementing some methods of the present invention.

Referring now to FIG. 8B, one exemplary implementation of a system for enabling and disabling Class III functionality will be described. One of skill in the art will appreciate that many other implementations could be used to achieve the inventive results disclosed herein. Broadly stated, in the case of Class III specific software routines residing in physically distinct memory devices (e.g., in memory device 884), the operating software would determine the type of game to be played. If the player had chosen to play a Class II game, the operating software would execute a write operation to hardware control register 881 to disable processor access to memory device 884. Similarly, if the code to be executed were Class III code, software would enable hardware control register 881 to allow master gaming controller 808 to access memory device 884.

In this example, hardware control register 881 is a memory location in a microprocessor's (e.g., master gaming controller 808's) memory map. Here, hardware control register 881 is implemented as circuitry that functions independently of the address decoding logic of address decoder 883.

For example, if master gaming controller 808 attempted to access memory device 884 in order to execute a Class III game, master gaming controller 808 would send a request to address decoder 883 to access memory device 884. Address decoder would send a select signal to combiner 889 and a hardware control select signal to hardware control register 881. Hardware control register 881 would send an enable control signal to combiner 889, which would combine the enable control signal and the select signal to produce a device enable signal for transmission to memory device 884. Memory device 884 would be enabled to put the requested data (in the broad sense of the term, including commands, etc.) on data bus 885.

On the other hand, if master gaming controller 808 is operating under a set of instructions for a Class II game, address decoding logic of address decoder 883 would set hardware control register 881 to disable access to memory device 884. Even if master gaming controller 808 were to attempt to access the memory range wherein the Class III-specific instructions are stored (here, memory device 884), hardware control register 881 would not permit such access. In some implementations, an error signal would be generated, e.g. by address decoder 883.

Preferably, some functions will be continued when the gaming machine reconfigures itself. For example, it is desirable to continue financial credits, player tracking functions, etc.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 808 may also communicate with EFT system 812, EZPay™ system 816 (a proprietary cashless ticketing system of the present assignee), and player tracking system 820. The systems of the gaming machine 802 communicate the data onto the network 822 via a communication board 818.

It will be appreciated by those of skill in the art that the present invention could be implemented on a network with more or fewer elements than are depicted in FIG. 8A. For example, player tracking system 820 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 824 and translator 825 are not required for all gaming establishments 801. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly. Moreover, the protocols used for Class II gaming may differ from those used for Class III gaming.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 842 provides this function for gaming establishment 801. Site controller 842 is connected to a central system and/or other gaming establishments via one or more networks, which may be public or private networks. Among other things, site controller 842 communicates with Class II game server 822 to obtain game data, such as ball drop data, bingo card data, pulltab data, etc. Site controller 842 also communicates with Class III game server 886 to make requests for Class III games, receive downloaded Class III games, etc.

In the present illustration, gaming machines 802, 830, 832, 834 and 836 are connected to a dedicated gaming network 822. In general, the DCU 824 functions as an intermediary between the different gaming machines on the network 822 and the site controller 842. In general, the DCU 824 receives data transmitted from the gaming machines and sends the data to the site controller 842 over a transmission path 826. In some instances, when the hardware interface used by the gaming machine is not compatible with site controller 842, a translator 825 may be used to convert serial data from the DCU 824 to a format accepted by site controller 842. The translator may provide this conversion service to a plurality of DCUs.

Further, in some dedicated gaming networks, the DCU 824 can receive data transmitted from site controller 842 for communication to the gaming machines on the gaming network. The received data may be, for example, communicated synchronously to the gaming machines on the gaming network.

Here, CVT 852 provides cashless and cashout gaming services to the gaming machines in gaming establishment 801. Broadly speaking, CVT 852 authorizes and validates cashless gaming machine instruments (also referred to herein as "tickets" or "vouchers"), including but not limited to tickets for causing a gaming machine to display a game result and cashout tickets. Moreover, CVT 852 authorizes the exchange of a cashout ticket for cash. These processes will be described in detail below. In one example, when a player attempts to redeem a cashout ticket for cash at cashout kiosk 844, cashout kiosk 844 reads validation data from the cashout ticket and transmits the validation data to CVT 852 for validation. The tickets may be printed by gaming machines, by cashout kiosk 844, by a stand-alone printer, by CVT 852, etc. Some gaming establishments will not have a cashout kiosk 844. Instead, a cashout ticket could be redeemed for cash by a cashier (e.g. of a convenience store), by a gaming machine or by a specially configured CVT.

Figure 9:
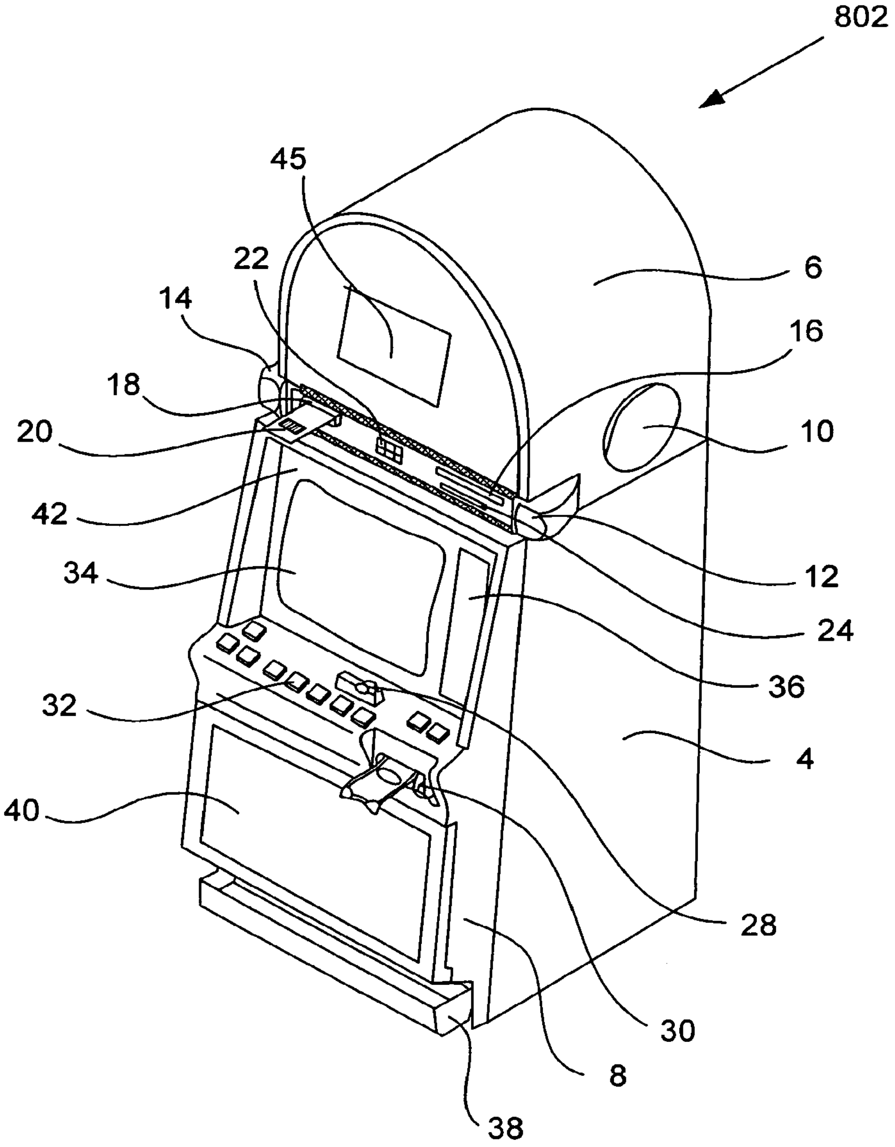
FIG. 9 illustrates an exemplary gaming machine that may be configured to implement some methods of the present invention.

Turning to FIG. 9, more details of gaming machine 802 are described. Machine 802 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36.

Display 34 may include an LCD, CRT, plasma, OLED, etc., capable of generating graphical representations relating to gaming. Some embodiments provide a "touch screen" display that allows a player to interact directly with a GUI displayed on the screen. The information panel 36 may be a back-lit, silk screened glass panel with lettering to indicate general game information including, for example, the number of coins played. The bill validator 30, player-input switches 32, video display monitor 34, and information panel are devices used to play a game on the game machine 802. The devices are controlled by circuitry housed inside the main cabinet 4 of the machine 802.

The gaming machine 802 includes a top box 6, which sits on top of the main cabinet 4. The top box 6 houses a number of devices, which may be used to add features to a game being played on the gaming machine 802, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and other features. Display 45 may be configured to display gaming information and/or player tracking information. For example, display 45 may be configured to display a bingo card or the like for Class II gaming. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 802 is but one example from a wide range of gaming machine designs on which the present invention may be implemented. For example, not all suitable gaming machines have top boxes or player tracking features. Further, some gaming machines have two or more game displays—mechanical and/or video. Some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers.

Returning to the example of FIG. 9, when a user wishes to play the gaming machine 802, he or she inserts cash through the coin acceptor 28 or bill validator 30. In addition, the player may use a cashless instrument of some type to register credits on the gaming machine 802. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions. For example, a player may vary his or her wager on a particular game, select a prize for a particular game, or make game decisions regarding gaming criteria that affect the outcome of a particular game (e.g., which cards to hold). The player may make these choices using the player-input switches 32, the video display screen 34 or using some other hardware and/or software that enables a player to input information into the gaming machine (e.g. a GUI displayed on display 16).

During certain game functions and events, the gaming machine 802 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 802, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 802. In some embodiments, these tickets may be used by a game player to obtain game services.

IGT gaming machines are implemented with special features and/or additional circuitry that differentiate them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the "standard" EIA RS232 serial interfaces provided by general-purpose computers. These interfaces may include EIA RS485, EIA RS422, Fiber Optic Serial, Optically Coupled Serial Interfaces, current loop style serial interfaces, etc. In addition, to conserve serial interfaces internally in the slot machine, serial devices may be connected in a shared, daisy-chain fashion where multiple peripheral devices are connected to a single serial channel.

IGT Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the trusted memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Figure 10:
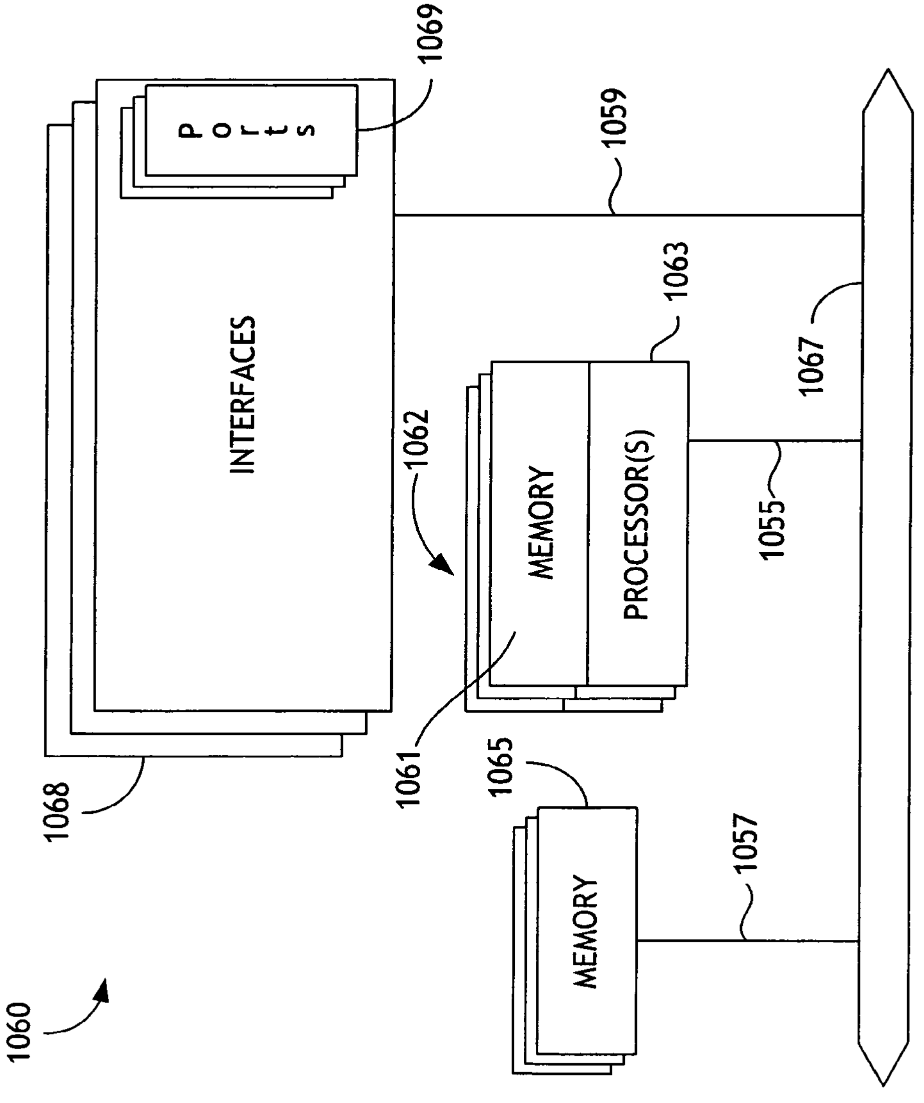
FIG. 10 is a block diagram of an exemplary network device that may be configured as a game server to implement some methods of the present invention.

FIG. 10 illustrates an example of a network device that may be configured as a game server for implementing some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 10) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims. For example, some gaming machines of the present invention allow multiple games to be played at the same time. Some such implementations allow a Class II game to be played at the same time as a Class III game. The Class III game can obtain (random) game data locally, whereas the Class II game obtains game data from a network device such as a central Class II game server. One game's start time need not be synchronous with another game's start time. U.S. Pat. No. 6,656,040 is hereby incorporated by reference for all purposes. In some such implementations, each game has its own display. U.S. Pat. No. 6,652,378 is hereby incorporated by reference for all purposes. For example, a first display could display a bingo game and show the results of that game while a second display show a slot game. Alternatively, one game could be displayed as an inset in a single screen that also displays a second game.

What is claimed is:

1. A combination Class II and Class III gaming machine, comprising:

means for providing Class II gaming;

means for providing Class III gaming; and means for determining when Class III gaming will be enabled or disabled based, at least in part, on a player's gaming history.

2. The gaming machine of claim 1, wherein the determining means comprises means for determining when the player has completed a session of Class III gaming.

3. The gaming machine of claim 2, wherein the means for determining when the player has completed a session of Class III gaming comprises means for determining a gaming account balance.

4. The gaming machine of claim 2, wherein the means for determining when the player has completed a session of Class III gaming comprises means for determining a proximity of a player.

5. The gaming machine of claim 2, wherein the means for determining when the player has completed a session of Class III gaming comprises means for determining whether the player has chosen another game.

6. The gaming machine of claim 2, wherein the means for determining when the player has completed a session of Class III gaming comprises means for determining whether the player has removed a player tracking card from the gaming machine.

7. The gaming machine of claim 2, wherein the means for determining when the player has completed a session of Class III gaming comprises means for determining that the player has not participated in the session of Class III gaming for a predetermined period of time.

8. The gaming machine of claim 7, wherein the predetermined period of time is based, at least in part, on the player's gaming history.

9. The gaming machine of claim 7, wherein a maximum allowable later time is based, at least in part, on the player's gaming history.

10. A method for providing Class II and Class III gaming on a single gaming machine, the method comprising:

providing Class II gaming on a gaming machine to a first player at a first time;

determining whether a Class III game can be played on the gaming machine; and providing Class III gaming on the gaming machine at a second time when it is determined that the Class III game can be played on the gaming machine;

wherein the determining step comprises determining when a second player has completed a session of Class III gaming on another gaming machine.

11. A computer program embodied in a non-transitory machine-readable medium, the computer program including instructions for controlling a gaming machine to perform the following steps:

providing Class II gaming on a gaming machine to a first player at a first time;

determining whether a Class III game can be played on the gaming machine; and providing Class III gaming on the gaming machine at a second time when it is determined that the Class III game can be played on the gaming machine;

wherein the instructions further comprise determining when a second player has completed a session of Class III gaming on another gaming machine.

* * * * *